US012687970B2

(12) United States Patent
Mulani et al.

(10) Patent No.: US 12,687,970 B2
(45) Date of Patent: Jul. 21, 2026

(54) ADAPTIVE POLLING FOR HIGHER DENSITY STORAGE

(71) Applicant: Micron Technology, Inc., Boise, ID (US)

(72) Inventors: Jameer Mulani, Bangalore (IN); Nitul Gohain, Bangalore (IN); Amiya Banerjee, Bangalore (IN); Rakeshkumar Dayabhai Vaghasiya, Hyderabad (IN)

(73) Assignee: Micron Technoiogy, Inc., Boise, ID (US)

( * ) Notice: Subject to any disclaimer, the term of this patent is extended or adjusted under 35 U.S.C. 154(b) by 0 days.

(21) Appl. No.: 18/603,033

(22) Filed: Mar. 12, 2024

(65) Prior Publication Data

US 2024/0345743 A1     Oct. 17, 2024

Related U.S. Application Data

(60) Provisional application No. 63/459,870, filed on Apr. 17, 2023.

(51) Int. Cl.
G06F 3/06 (2006.01)

(52) U.S. Cl.
CPC .......... G06F 3/0625 (2013.01); G06F 3/0653 (2013.01); G06F 3/0679 (2013.01)

(58) Field of Classification Search
CPC .... G06F 3/0625; G06F 3/0653; G06F 3/0679; G06F 3/0659; G06F 11/3058; G06F 11/3037; G11C 29/56
USPC .......................................... 711/103
See application file for complete search history.

(56) References Cited

U.S. PATENT DOCUMENTS

| | | | |
|---|---|---|---|
| 2019/0011965 A1* | 1/2019 | Seyed | G06F 3/011 |
| 2021/0181981 A1* | 6/2021 | Zhu | G06F 3/0679 |
| 2023/0315314 A1* | 10/2023 | Yang | G06F 3/0634 |
| | | | 711/154 |
| 2023/0342273 A1* | 10/2023 | Taira | G06F 1/187 |

* cited by examiner

*Primary Examiner* — Hua J Song
(74) *Attorney, Agent, or Firm* — Holland & Hart LLP

(57) ABSTRACT

Methods, systems, and devices for adaptive polling for higher density storage are described. A controller of a memory system may identify a temperature of the memory device and select one or more polling parameters that are associated with identifying a status of the memory device based on a temperature of a memory system. In some cases, the controller may perform a polling operation according to the one or more polling parameters based on selecting the one or more polling parameters.

20 Claims, 5 Drawing Sheets

ADAPTIVE POLLING FOR HIGHER DENSITY STORAGE

CROSS REFERENCE

The present application for patent claims the benefit of U.S. Provisional Patent Application No. 63/459,870 by MULANI et al., entitled "ADAPTIVE POLLING FOR HIGHER DENSITY STORAGE," filed Apr. 17, 2023, assigned to the assignee hereof, and expressly incorporated by reference herein.

TECHNICAL FIELD

The following relates to one or more systems for memory, including an adaptive polling for higher density storage (e.g., quad-level cell operations).

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
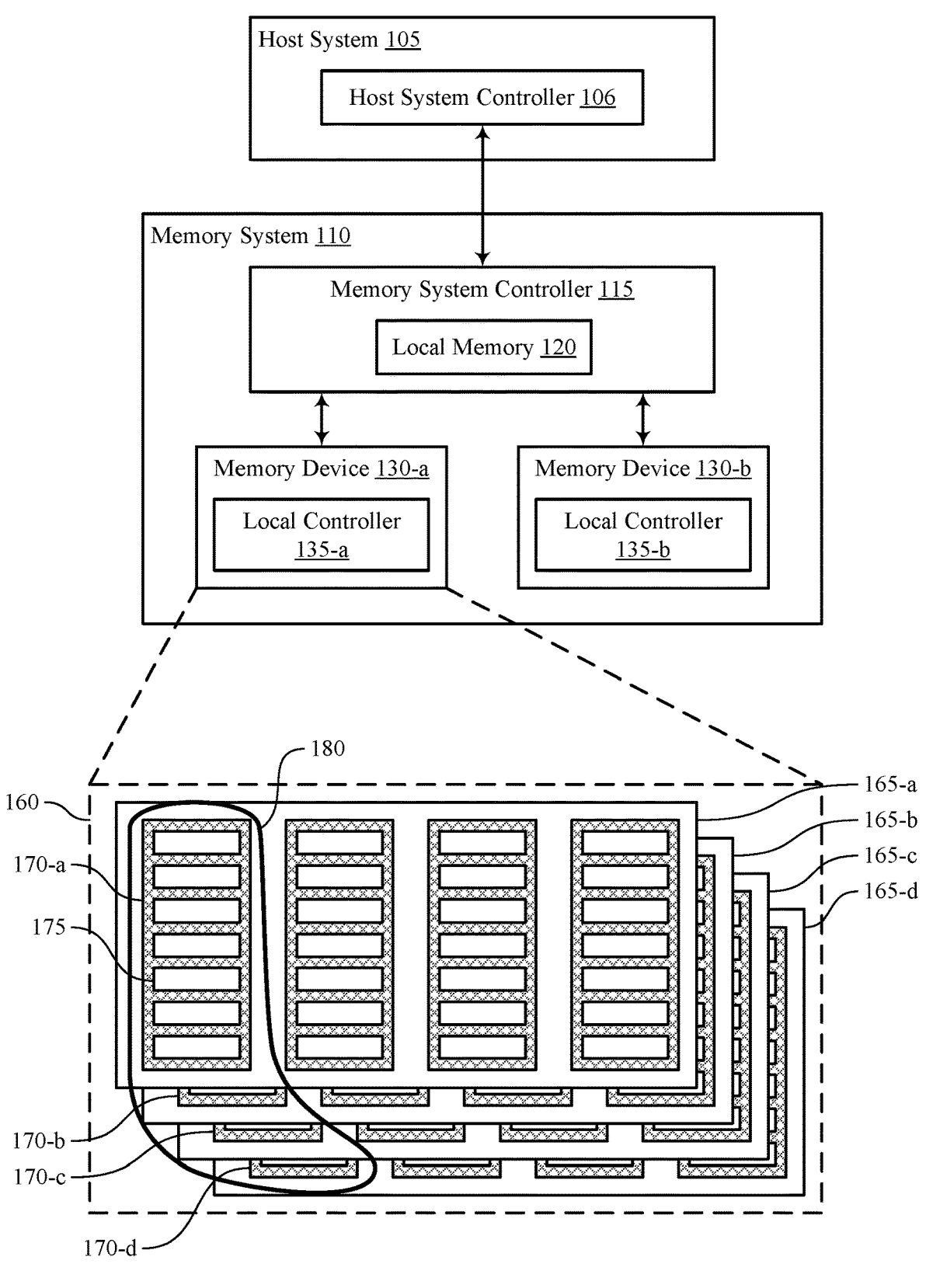
FIG. 1 illustrates an example of a system that supports adaptive polling for higher density storage in accordance with examples as disclosed herein.

A memory system, including a not-and (NAND) memory device, may be configured to store four bits of information as quad-level cells (QLCs). In some cases, NAND memory devices may be sensitive to temperature conditions, especially for higher density storage where read window budgets for each state may be smaller. For example, as temperature increases, access operations (e.g., program and read) may be completed faster because of a lower channel resistance. Access operation times for QLC data may be longer than data associated triple-level cells (TLCs) or other types of cells that store three or fewer bits of information. In some cases, the block size for QLC memory may be larger than TLC memory and other types of memory cells (e.g., because each memory cell stores more bits per memory cell than other types). In such cases, QLC memory may be more sensitive to temperature fluctuations than TLC memory and deviations may be seen for access operations such as program and read operations with respect to temperature. As the temperature increases, leakage current and charge loss may increase, thereby impacting the data retention by increasing the power consumption of the memory system.

In some cases, the memory system may perform a polling operation. The polling operation may enable the memory system to identify a status of the memory system (e.g., whether the memory system has completed the access operation). The polling operation may be performed according to one or more polling parameters that include a frequency parameter that indicates a frequency at which the polling operation occurs and a polling delay that indicates the time between a portion of the access operation and a first instance of the polling operation. In some cases, the memory system may perform the polling operation frequently which may waste resources to perform the polling operation, thereby decreasing the overall efficiency of the memory system. In other examples, the memory system may perform the polling operation infrequently which may waste time that otherwise may be used to perform operations because the status of the memory system has changed and the host system may be unaware.

To improve the overall performance, the polling parameters may be selected based on the temperature of a memory device of the memory system. For example, the polling parameters may be adjusted based on the temperature of the memory device. The controller of the memory system may measure the temperature, and the polling parameters may be selected based on the measured temperature. For example, the controller of the memory system may decrease the polling delay, increase the frequency parameter, or both based on the temperature of the memory device increasing. In other examples, the controller of the memory system may increase the polling delay, decrease the frequency parameter, or both in response to determining that the temperature of the memory device decreases. Adjusting the polling parameters based on the temperature may improve the performance of the memory system by aligning a speed of performing actions with the temperature of the memory device of the memory system.

The controller of the memory system may identify a temperature of the memory device and select one or more polling parameters that are associated with identifying a status of the memory device. By selecting the polling parameters based on the temperature, the controller of the memory system may perform the polling operation according to the temperature of the memory device which may efficiently use resources to perform the polling operation, thereby increasing the overall efficiency of the memory system and optimizing the performance. In some cases, adjusting the polling parameters based on the temperature may decrease the latency for performing status checks, thereby efficiently notifying the host system of a status change such that the host system may send additional commands to perform operations. The system may also experience improved data retention by reducing power consumption by the memory system and increase the reliability and security of the memory system, thereby allowing the memory system or other components to perform operations at improved speeds, efficiency, and performance.

Features of the disclosure are initially described in the context of a system with reference to FIG. 1. Features of the disclosure are described in the context of systems and flow diagrams with reference to FIGS. 2 and 3. These and other features of the disclosure are further illustrated by and described in the context of apparatus diagrams and flowcharts that relate to adaptive polling for higher density storage with reference to FIGS. 4 and 5.

FIG. 1 illustrates an example of a system 100 that supports adaptive polling for higher density storage in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support adaptive polling for higher density storage. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Techniques may be described to increase the efficiency of the memory system 110 by selecting one or more polling parameters based on the temperature of the memory device 130. For example, the memory system controller 115 may measure (e.g., check a temperature of the memory system 110), select polling parameters based on the temperature, and perform a polling operation based on the selected polling parameters.

In addition to applicability in memory systems 110 as described herein, techniques for adaptive polling for memory systems 110 may be generally implemented to improve the performance of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance of electronic devices may be desirable. Implementing the techniques described herein may improve the performance of electronic devices by improving a throughput of data and reducing response times, among other benefits.

Figures 2A, 2B:
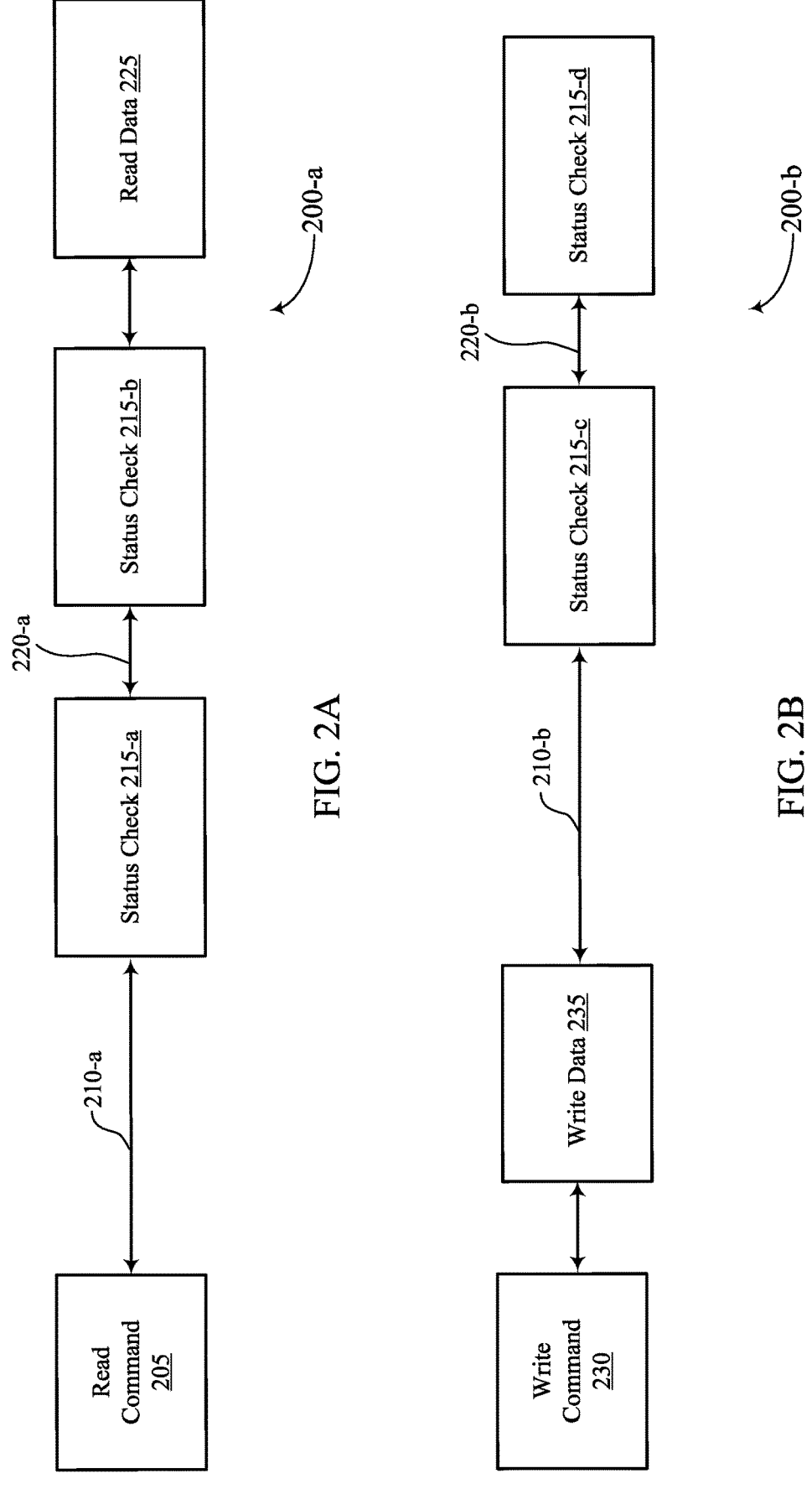
FIG. 2A illustrates an example of a system that supports adaptive polling for higher density storage in accordance with examples as disclosed herein.
FIG. 2B illustrates an example of a system that supports adaptive polling for higher density storage in accordance with examples as disclosed herein.

FIG. 2A illustrates an example of a system 300-*a* that supports adaptive polling for higher density storage in accordance with examples as disclosed herein. The system 200-*a* may illustrate techniques for performing a polling operation according to one or more polling parameters with a read operation. The system 200 may receive a read command 205. For example, the host system may send the read command 205 to the memory system. After issuance of the read command 205, the system 200 may perform the polling operation according to one or more polling parameters that are associated with identifying a status of the memory device. The polling operation may include a polling delay 210-*a*, status checks 215, and a polling frequency 220-*a*.

For example, the polling parameters may include a duration of time between receiving an access command (e.g. read command 205) and identifying the status of the memory device, a frequency of identifying the status of the memory device, the duration of time between identifying the status of the memory device, or a combination thereof. The polling delay 210-*a* may be an example of the duration of time between receiving the read command 205 and identifying the status of the memory device at status check 215-*a*. The polling frequency 220-*a* may be an example of a frequency of identifying the status of the memory device at status check 215-*a* and status check 215-*b*. In some cases, the polling frequency 220-*a* may be an example of the duration of time between identifying the status of the memory device (e.g., between status check 215-*a* and status check 215-*b*).

The system 200 may receive the read command 205, and the system 200 may wait a duration of time indicated by polling delay 210-*a* before performing the status check 215-*a*. The polling delay 210-*a* may be an example of an initial polling delay that indicates a duration of time between a receipt of an access command (e.g., the read command 205) and a first instance of the polling operation (e.g., status check 215-*a*). In some cases, the polling delay 210-*a* may indicate a duration of time that the host system may wait until requesting to perform the status checks 215 of the memory device. The polling delay 210-*a* may be an example of a predefined duration of time based on temperature of the memory device during a read operation. For example, the polling delay 210-*b* may be 70 microseconds (ms). In some cases, the polling delay 210-*a* may vary according to a temperature of the memory device, an age of the memory device, or both. For example, the polling delay 210-*a* may be adjusted to be 65 ms, thereby shortening the polling delay 210-*a*.

As described herein, the polling delay 210-*a* may be adjusted based on the temperature of the memory device to optimize the efficiency of the polling operation and align with timing of the polling operation with the speed of performing the read operation for the corresponding temperature of the memory device.

The system 200 may perform the first instance of the polling operation by performing the status check 215-*a*. The status checks 215 (e.g., a portion of the polling operation) may be an example of determining whether the memory device has performed the read command, whether data is ready to be sent to the host system, or both. The system 200 may perform one or more status checks 215 based on the polling frequency 220-*a*. In some cases, the system 200 may determine that the status of the memory device has not changed, and the system 200 may perform a second instance of the polling operation (e.g., status check 215-*b*). The system 200 may perform the status check 215-*b* based on the polling frequency 220-*a*. For example, the polling frequency 220-*a* may indicate a frequency at which the polling operation occurs. In such cases, the polling frequency 220-*a* may indicate how often the system 200 performs a status check 215, a duration of time between status checks 215, or both. As described herein, the polling frequency 220-*a* may be adjusted based on the temperature of the memory device to optimize the performance of the memory device by matching the timing of the polling operation with the speed of performing the read operation for the corresponding temperature of the memory device.

In some cases, the system 200 may perform the second instance of the polling operation by performing the status check 215-*b*. The system 200 may determine that the status of the memory device has changed, and the system 200 may read data 225 in response to determining that the status has changed. In such cases, the system 200 may transmit the read data 225 to the host system via a channel. In some cases, the system 200 may transmit the status to the host system. For example, the system 200 may indicate to the host system that the status has not changed, and the memory system may continue to perform the polling operation until the status has changed. In other examples, the system 200 may indicate to the host system that the status has changed, and the memory device may read data 225 and send the read data 225 to the host system.

By performing the polling operation frequently or starting the polling operation before that system is ready to perform the read operation, the system 200 may experience a drop in performance due to the read status overhead. In such cases, an increased amount of bandwidth and overhead may be consumed in response to starting the polling operation too early, thereby degrading the performance of the system 200.

In other examples, by performing the polling operation less frequently or starting the polling operation after the system is ready to perform access operations, the system 200 may experience an increase in the read latency, thereby decreasing the efficiency and overall performance of the memory system. For example, polling less frequently may impact a drop in the performance because even though the memory device has completed the read operation, the system 200 is not moving forward with the next operation. In such cases, the controller of the memory system may select the polling parameters for the polling operation based on the temperature to balance the polling delay 210-*a*, the polling frequency 220-*a*, or both with the speed of executing the read command 205 for the temperature of the memory device.

FIG. 2B illustrates an example of a system 200-*b* that supports adaptive polling for higher density storage in accordance with examples as disclosed herein. The system 200-*b* may illustrate techniques for performing a polling operation according to one or more polling parameters with a program (e.g., write) operation. The system 200 may receive a write command 230. For example, the host system may send the write command 230 to the memory system. After issuance of the write command, the system 200 may write data 235, and then the system 200 may perform the polling operation according to one or more polling parameters that are associated with identifying a status of the memory device. The polling operation may include the polling delay 210-*b*, status checks 215, and the polling frequency 220-*b*.

The polling parameters may include a duration of time between receiving the access command (e.g. write command 230) and identifying the status of the memory device, a frequency of identifying the status of the memory device, the duration of time between each instance of identifying the status of the memory device, or a combination thereof. The polling delay 210-*b* may be an example of the duration of time between receiving the data to be written to the memory device (e.g., write data 235) and identifying the status of the memory device at status check 215-*c*. The polling frequency 220-*b* may be an example of a frequency of identifying the status of the memory device at status check 215-*c* and status check 215-*d*. In some cases, the polling frequency 220-*b* may be an example of the duration of time between identifying the status of the memory device (e.g., between status check 215-*c* and status check 215-*d*).

The system 200 may receive the write command 230, execute the write command 230 by writing the data 235, and the system 200 may wait a duration of time indicated by polling delay 210-*b* before performing the status check 215-*c*. The polling delay 210-*b* may be an example of polling delay 210-*a* as described with reference to FIG. 2A. As described herein, the polling delay 210-*b* may be selected based on the temperature of the memory device to optimize the efficiency of the polling operation and align with timing of the polling operation with the speed of performing the write operation for the corresponding temperature of the memory device.

The system 200 may perform the first instance of the polling operation by performing the status check 215-*c* after the polling delay 210-*b*. The status checks 215 (e.g., a portion of the polling operation) may be an example of determining whether the memory device has performed the write command, whether data is ready to be sent to the host system, or both. The system 200 may perform one or more status checks 215 based on the polling frequency 220-*b*. In some cases, the system 200 may determine that the status of the memory device has not changed, and the system 200 may perform a second instance of the polling operation (e.g., status check 215-*d*). The system 200 may perform the status check 215-*d* based on the polling frequency 220-*b*. The polling frequency 220-*b* may be an example of the polling frequency 220-*a* as described with reference to FIG. 2A. As described herein, the polling frequency 220-*b* may be selected based on the temperature of the memory device to optimize the performance of the memory device by matching the timing of the polling operation with the speed of performing the write operation for the corresponding temperature of the memory device.

In some cases, the temperature of the memory device may affect the performance of the memory device. For example, as the temperature increase, the time to program the memory device may increase, and the time to read the memory device may increase. In some cases, current may leak from the memory device and the charge loss of the memory device may increase as the temperature increases, thereby decreasing the data retention and increasing the power consumed by the memory device.

In some cases, QLC memory cells may include an increased sensitivity to the temperature condition as compared to SLC and TLC memory cells. The increased sensitivity for QLC memory cells may be due to the fact that access operation times for QLC data may be longer that other types of cells that store three or fewer bits of information as well as the block size for QLC memory being larger than other types of memory cells (e.g., because each memory cell stores more bits than other memory cells).

As such, the polling parameters for QLC polling operations may be optimized based on the temperature of the memory device. By selecting the polling parameters based on the temperature, the controller of the memory system may efficiently use resources to perform the polling operation, thereby increasing the overall efficiency of the memory device and optimizing the performance. In some cases, adjusting the polling parameters based on the temperature may improve a data retention of the memory device by reducing the power consumption by the memory device and increasing the reliability of the memory device, thereby allowing the memory device or other components to perform operations at improved speeds, efficiency, and performance. In some cases, selecting the polling parameters based on the temperature may optimize the polling overhead and decrease the time to perform program operations, read operations, or both for the QLC memory, thereby improving the read and write performance of the memory device.

Figure 3:
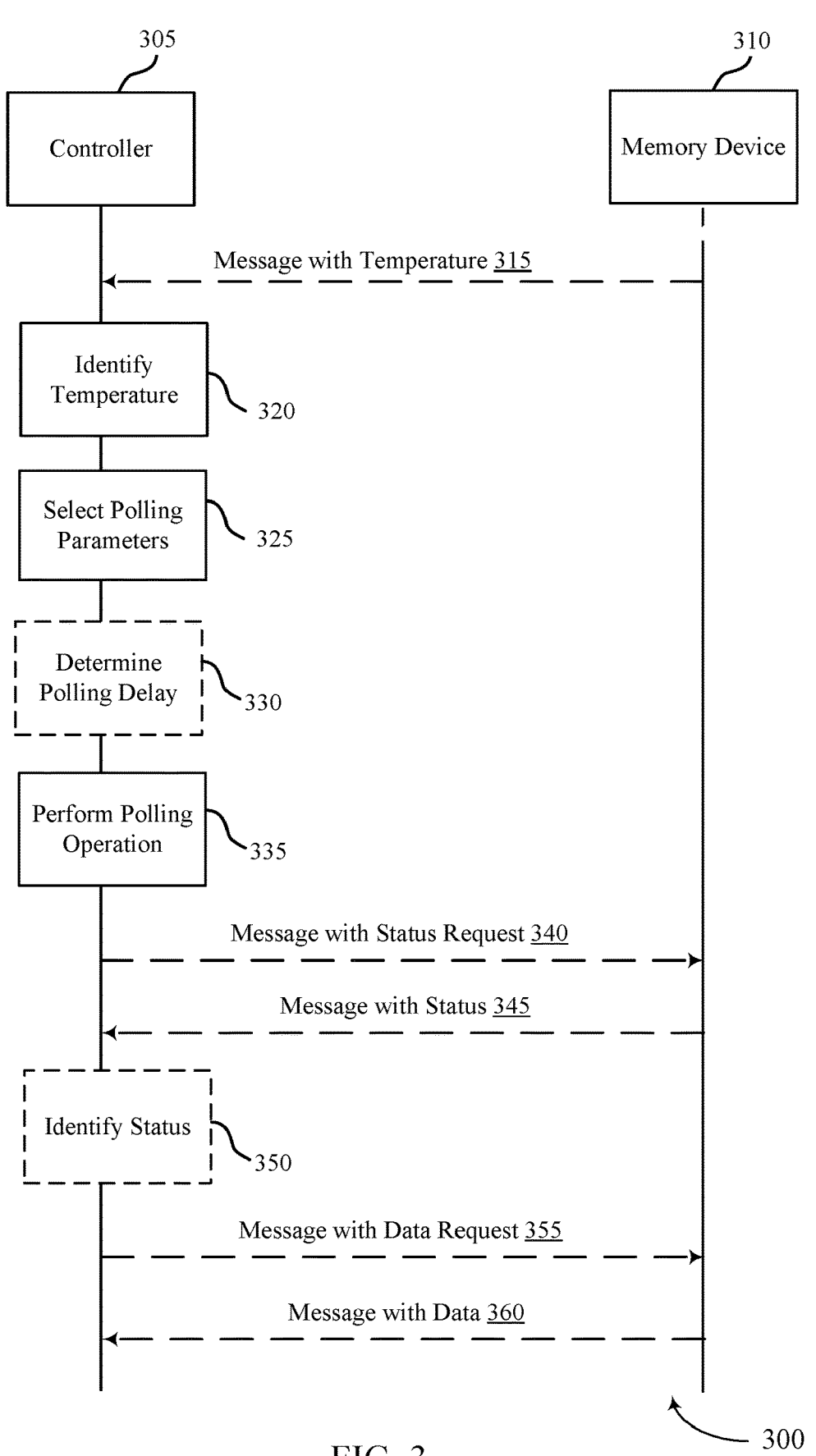
FIG. 3 illustrates an example of a flow diagram that supports adaptive polling for higher density storage in accordance with examples as disclosed herein.

FIG. 3 illustrates an example of a flow diagram 300 that supports an adaptive polling for higher density storage in accordance with examples as disclosed herein. Flow diagram 300 may include controller 305 and memory device 310, which may be respective examples of a controller and memory device as described in reference to FIGS. 1 and 2. Alternative examples of the following may be implemented, where some steps are performed in a different order or not at all. Some steps may additionally include additional features not mentioned below. The flow diagram 300 illustrates techniques where a controller 305 selects the polling parameters and performs the polling operation according to the selected polling parameters.

Aspects of the flow diagram 300 may be implemented by the controller 305, among other components. Additionally or alternatively, aspects of the flow diagram 300 may be implemented as instructions stored in memory (e.g., firmware stored in a memory coupled with the memory system). For example, the instructions, if executed by the controller 305 (e.g., the memory system controller 115), may cause the controller 305 to perform the operations of the flow diagram 300.

At 315, a message with the temperature may be received. For example, the memory device 310 may transmit the message with the temperature, and the controller 305 may receive the message with the temperature. In some cases, the memory device 310 may transmit an indication that a change of temperature of the memory device 310 satisfies a criterion. In such cases, the controller 305 may receive the indication that the change of temperature of the memory device 310 satisfies a criterion.

At 320, a temperature of the memory device 310 may be identified. For example, the controller 305 may measure the temperature to identify the temperature of the memory device 310. The controller 305 may measure the temperature from the controller 305 of the memory system. In some cases, the controller 305 may measure the temperature at a junction and/or die level of the memory device 310. The controller 305 identify the temperature in response to receiving the message with the temperature.

In some examples, the controller 305 may determine whether the temperature of the memory device 310 satisfies a threshold based on identifying the temperature of the memory device 310. In such cases, the controller 305 may determine whether the temperature satisfies a threshold and adjust a frequency at which the temperature is checked (e.g., measured) based on the temperature satisfying the threshold. The controller 305 may determine whether the temperature of the memory device 310 satisfies the threshold by determining that the temperature of the memory device 310 is higher than the threshold. In such cases, the controller 305 may determine that the temperature is high, and the controller 305 may increase a frequency at which the temperature of the memory device 310 is checked. In other examples, the controller 305 may determine whether the temperature of the memory device 310 satisfies the threshold by determining that the temperature of the memory device 310 is lower than the threshold. In such cases, the controller 305 may decrease the frequency at which the temperature is checked in response to determining that the temperature is low.

The controller 305 may determine that if the temperature is outside a temperature range, the controller 305 may increase or decrease the frequency at which the temperature is checked to control the temperature of the memory device 310. By maintaining a rate at which the temperature is checked, the temperature of the memory device 310 may increase between temperature checks, thereby increasing the power consumption and decreasing the overall performance of the memory system. In such cases, the controller 305 may periodically check the temperature of the memory device 310 and increase the frequency at which the temperature is checked as the temperature increases. For example, the controller 305 may check the temperature starting at 65 degree Celsius and continue to measure the temperature at a constant rate (e.g., every one second) until the temperature reaches 75 degree Celsius. The frequency at which the temperature is checked may increase after the temperature reaches 75 degree Celsius (e.g., measured every 0.5 seconds).

In some cases, the controller 305 may determine whether the temperature of the memory device 310 has changed in response to identifying the temperature. For example, the controller 305 may determine whether a change of the temperature of the memory device 310 satisfies a criterion after identifying the temperature of the memory device 310. The controller 305 may determine that the temperature has changed or has not changed based on identifying the temperature.

Enabling the controller 305 to adjust the polling parameters based on the temperature may increase the efficiency for the checking the status of the memory device 310 and performing operations based on the status. For example, the host system may be unresponsive or unaware of the status (e.g., state) of the memory system, which may allow the memory system to continue performing operations after the access operation occurs, thereby increasing a quantity of power consumed and/or complications caused by corrupted code and data. Such cases may pose a threat to the security and safety of the memory system (e.g., including the controller 305 and the memory device 310).

At 325, polling parameters may be selected. For example, the controller 305 may select polling parameters based on the temperature of the memory device 310. The controller 305 may select the polling parameters that are associated with identifying a status of a memory device 310 in response to identifying the temperature. In some examples, the controller 305 may identify the temperature and adjust the polling parameters in parallel to performing an access operation. In such cases, the controller 305 may select the polling parameters at a same time as performing the access operation In some cases, the controller 305 may select the polling parameters in response to determining whether the change of the temperature satisfies the criterion. For example, the controller 305 may select the polling parameters in response to determining that the change of the temperature satisfies the criterion (e.g., that the temperature of the memory device 310 has changed). In some cases, the controller 305 may refrain from adjusting the polling parameters based on determining that the temperature has not changed. In such cases, the controller 305 may perform the polling operation with the same polling parameter as the previous polling operation.

In some cases, the controller 305 may adjust a frequency parameter of the polling parameters in response to determining that the temperature of the memory device 310 satisfies the threshold. The frequency parameter may indicate a frequency at which the polling operation occurs. The frequency parameter may be an example of the polling frequency. For example, the controller 305 may adjust the frequency parameter by selecting a value for the frequency parameter that causes the polling operation to occur more frequently based on determining that the temperature of the memory device 310 satisfies the threshold. In such cases, the controller 305 may identify that the temperature of the memory device 310 is higher than the threshold, and the controller 305 may adjust the frequency parameter to perform the polling operation more frequently. For example, the controller 305 may increase the frequency parameter in response to determining that the temperature of the memory device 310 is higher than threshold.

In other examples, the controller 305 may adjust the frequency parameter by selecting a value for the frequency parameter that causes the polling operation to occur less frequently based on determining that the temperature of the memory device 310 satisfies the threshold. The controller 305 may determine that the temperature of the memory device 310 satisfies the threshold by determining that the temperature of the memory device 310 is lower than the threshold, and in response, the controller 305 may decrease the frequency at which the polling operation occurs. For example, the controller 305 may decrease the frequency parameter in response to determining that the temperature of the memory device 310 is lower than the threshold. The controller 305 may perform polling operations slower at lower temperatures than at higher temperatures. For example, as the temperature increases, the value of the polling frequency decreases, thereby increasing a frequency at which the polling operation occurs. The value of the polling frequency may increase as the temperature decreases, thereby decreasing a frequency at which the polling operation occurs.

The controller 305 may adjust an initial polling delay for a NAND read operation. The initial polling delay may indicate a duration of time between a receipt of an access command at the memory device 310 and a first instance of the polling operation, as described with reference to FIG. 2A. In such cases, the controller 305 may adjust the polling delay in response to identifying the temperature of the memory device 310. The controller 305 may adjust the initial polling delay for a NAND program operation. The initial polling delay may indicate a duration of time between receiving data to be written to the memory device 310 and a first instance of the polling operation, as described with reference to FIG. 2B. For example, the initial polling delay may be adjusted by selecting a value for the initial polling delay that increases the duration of time or decreases the duration of time. In such cases, the controller 305 may select a value for the initial polling delay that causes the polling operation to start earlier or later based on identifying the temperature of the memory device 310. As the temperature increases, the value of the initial polling delay decreases, thereby decreasing the time between receipt and/or execution of the access command the first instance of the polling operation.

The polling parameters may include a duration of time between receiving an access command and identifying the status of the memory device 310 (e.g., the initial polling delay), a frequency of identifying the status of the memory device 310 (e.g., the polling frequency), the duration of time between identifying the status of the memory device 310 (e.g., a polling time), or a combination thereof. Enabling the controller 305 to select the polling parameters based on the temperature of the memory device 310 may decrease the power consumption, increase the efficiency for performing operations, and increase the overall performance of the memory system.

In some cases, the controller 305 may select the polling parameters from a finite list. For example, the controller 305 may select the polling parameters from a look-up table where the look-up table includes a set of temperatures of the memory device 310 and a corresponding set of polling parameters (e.g., including at least the initial polling delay and the polling frequency). In such cases, the controller 305 may select one or more polling parameters from the set of polling parameters that are associated with the identified temperature from the set of temperatures. The set of temperatures may include an individual temperature, a range of temperatures, or both. In some examples, the look-up table may include a set of temperature changes of the memory device 310 and a corresponding set of polling parameters. In such cases, the controller 305 may select one or more polling parameters from the set of polling parameters that are associated with the change in temperature from the set of temperatures changes. For example, the look-up table may include a ten degree increase in the temperature, and the corresponding one or more polling parameters for a ten degree increase in temperature.

In some cases, the controller 305 may select the polling parameters from a tunable configuration (e.g., an equation-based approach). For example, the controller 305 may select the polling parameters by inputting the temperature of the memory device 310 into an equation. In such cases, a small difference in the temperature change may change the polling parameters. The equation may be an example of timing at the maximum temperature plus change in slope of the NAND time increase equals initial polling time. The equation may be an example of optimum polling frequency at the maximum temperature minus the change in slope of the NAND time increase equals the polling frequency.

At 330, a polling day may be determined. For example, the controller 305 may determine a duration for performing the polling operation based on selecting the one or more polling parameters. In such cases, the controller 305 may determine the initial polling delay.

In some cases, an access command may be received at the controller 305. For example, the controller 305 may receive the access command to perform an access operation at the memory device 310. The host system may transmit the access command. In some cases, the access command may be transmitted independent of the polling operation. For example, the host system may transmit the access command before the polling operation is performed. In some cases, the controller 305 may receive a read command to perform a read operation at the memory device 310. In some cases, the read command may be transmitted independent of the polling operation. For example, the host system may transmit the read command before the polling operation is performed.

At 335, the polling operation may be performed. For example, the controller 305 may perform the polling operation based on selecting the one or more polling parameters. In such cases, the polling operation may be performed according to the polling parameters. In some cases, the controller 305 may perform the polling operation based on determining that a change of the status fails to satisfy the criterion. For example, the controller 305 may determine that the status of the memory device 310 does not change and may perform the polling operation in response to determining that the status of the memory device 310 does not change. The controller 305 may continue to perform the polling operation until the status of the memory device 310 changes. In some cases, the polling operation may be performed based on receiving the access command, receiving the read command, receiving a command to perform the polling operation, performing a write operation at the memory device 310, or a combination thereof.

At 340, a status request may be transmitted. For example, the controller 305 may transmit, to the memory device 310, a message requesting the memory device 310 to transmit an indication of the status of the memory device 310. In such cases, the controller 305 may request the status of the memory device 310. The controller 305 may transmit the message requesting the memory device 310 to transmit an indication of the status of the memory device 310 based on (e.g., after) selecting the one or more polling parameters, performing the polling operation, or both. The memory device 310 may receive the message with the status request after the polling operation is performed. In some cases, the memory device 310 may receive the message with the status request before the polling operation is performed.

At 345, a message with the status may be received. The memory device 310 may transmit, to the controller 305, the message with the status. In such cases, the controller 305 may receive the message with the status that may include an indication of a change of the status of the memory device 310. For example, the controller 305 may receive an indication that the memory device 310 fails to satisfy the criterion based on transmitting the message with the status request. The controller 305 may receive, from the memory device 310, a message including an indication that the change of the status of the memory device 310 satisfies the criterion in response to transmitting the message requesting the status. For example, the memory device 310 may transmit a message indicating that the status of the memory device 310 has changed.

At 350, a status of the memory device 310 may be identified. For example, the controller 305 may identify the status of the memory device 310 in performing an access operation based on performing the polling operation according to the polling parameters. In some cases, the controller 305 may determine whether a change of the status of the memory device 310 satisfies the criterion in response to identifying the status of the memory device 310. For example, the controller 305 may determine whether the status of the memory device 310 changes. The controller 305 may determine that the status of the memory device 310 has changed (e.g., satisfies the criterion) or that the status of the memory device 310 has not changed (e.g., fails to satisfy the criterion).

At 355, a message with a data request may be transmitted. For example, the controller 305 may transmit, to the memory device 310, a message requesting the memory device 310 to transmit data that is ready to be transmitted as part of the access operation. The controller 305 may transmit the message requesting that the memory device 310 transmits data in response to receiving the message with the indication that the status of the memory device 310 has changed.

At 360, a message with the data may be received. For example, the memory device 310 may transmit a message that indicates data is ready to be transmitted as part of the access operation. The controller 305 may receive, from the memory device 310, the message that indicates the data is ready to be transmitted as part of the access operation. In some cases, the controller 305 may receive the message that indicates the data is ready to be transmitted in response to transmitting the message with the data request.

Figure 4:
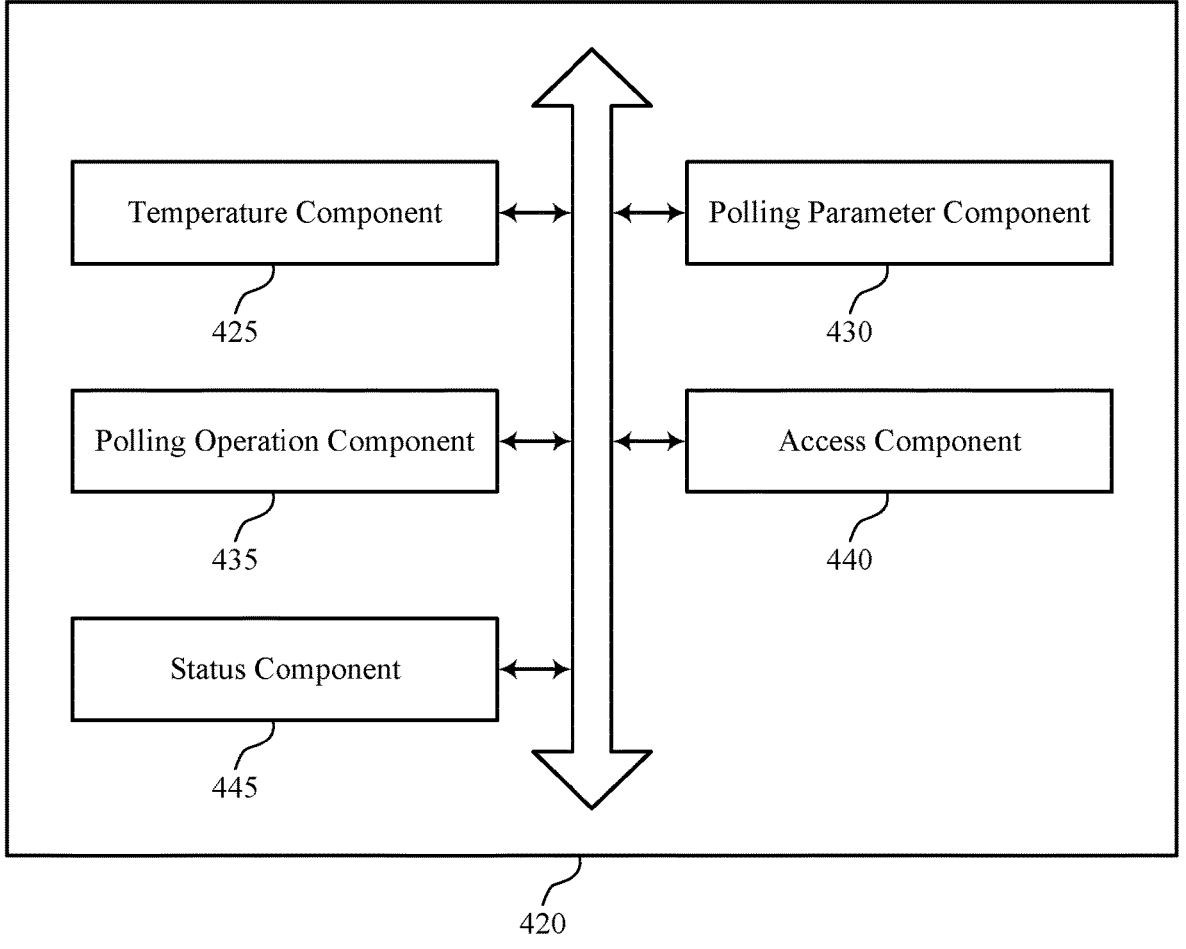
FIG. 4 illustrates a block diagram of a memory system that supports an adaptive polling for higher density storage in accordance with examples as disclosed herein.

FIG. 4 illustrates a block diagram 400 of a memory system 420 that supports an adaptive polling for higher density storage in accordance with examples as disclosed herein. The memory system 420 may be an example of aspects of a memory system as described with reference to FIGS. 1 through 3. The memory system 420, or various components thereof, may be an example of means for performing various aspects of an adaptive polling for higher density storage as described herein. For example, the memory system 420 may include a temperature component 425, a polling parameter component 430, a polling operation component 435, an access component 440, a status component 445, or any combination thereof. Each of these components may communicate, directly or indirectly, with one another (e.g., via one or more buses).

The temperature component 425 may be configured as or otherwise support a means for identifying a temperature of a memory device. The polling parameter component 430 may be configured as or otherwise support a means for selecting one or more polling parameters that are associated with identifying a status of a memory device based at least in part on the temperature of the memory device. The polling operation component 435 may be configured as or otherwise support a means for performing a polling operation according to the one or more polling parameters based at least in part on selecting the one or more polling parameters.

In some examples, the temperature component 425 may be configured as or otherwise support a means for determining whether a change of the temperature of the memory device satisfies a criterion based at least in part on identifying the temperature of the memory device, where selecting the one or more polling parameters is based at least in part on determining whether the change of the temperature satisfies the criterion.

In some examples, the access component 440 may be configured as or otherwise support a means for receiving, from a host system, an access command to perform an access operation at the memory device, where performing the polling operation is based at least in part on receiving the access command and receiving a command to perform the polling operation.

In some examples, the status component 445 may be configured as or otherwise support a means for identifying the status of the memory device in performing an access operation based at least in part on performing the polling operation according to the one or more polling parameters. In some examples, the status component 445 may be configured as or otherwise support a means for determining whether a change of the status of the memory device satisfies a criterion based at least in part on identifying the status of the memory device, where performing the polling operation according to the one or more polling parameters is based at least in part on determining that the change of the status fails to satisfy the criterion.

In some examples, the temperature component 425 may be configured as or otherwise support a means for determining whether the temperature of the memory device satisfies a threshold based at least in part on identifying the temperature of the memory device. In some examples, the polling parameter component 430 may be configured as or otherwise support a means for adjusting a frequency parameter of the one or more polling parameters based at least in part on determining that the temperature of the memory device satisfies the threshold, the frequency parameter indicating a frequency at which the polling operation occurs.

In some examples, determining whether the temperature of the memory device satisfies the threshold further includes determining that the temperature of the memory device is higher than the threshold based at least in part on identifying the temperature of the memory device. In some examples, adjusting the frequency parameter further includes selecting a value for the frequency parameter that causes the polling operation to occur more frequently.

In some examples, the polling parameter component 430 may be configured as or otherwise support a means for adjusting a delay indicating a duration of time between a receipt of an access command at the memory device and a first instance of the polling operation based at least in part on identifying the temperature of the memory device.

In some examples, the polling parameter component 430 may be configured as or otherwise support a means for adjusting a delay indicating a duration of time between writing data to the memory device and a first instance of the polling operation based at least in part on identifying the temperature of the memory device.

In some examples, the one or more polling parameters include a duration of time between receiving an access command and identifying the status of the memory device, a frequency of identifying the status of the memory device, the duration of time between identifying the status of the memory device, or a combination thereof.

In some examples, the temperature component 425 may be configured as or otherwise support a means for receiving, from the memory device, a second message including a temperature of the memory device, where identifying the temperature of the memory device is based at least in part on receiving the second message.

In some examples, the temperature component 425 may be configured as or otherwise support a means for receiving, from the memory device, an indication that a change of a temperature of the memory device satisfies a criterion, where performing the polling operation is based at least in part on receiving the indication.

In some examples, the polling operation component 435 may be configured as or otherwise support a means for determining a duration for performing the polling operation based at least in part on selecting the one or more polling parameters.

In some examples, to support performing the polling operation, the polling operation component 435 may be configured as or otherwise support a means for transmitting, to the memory device, a third message requesting the memory device to transmit an indication of the status of the memory device based at least in part on selecting the one or more polling parameters.

In some examples, the status component 445 may be configured as or otherwise support a means for receiving, from the memory device, a fourth message including an indication that a change of the status of the memory device fails to satisfy a criterion based at least in part on transmitting the third message, where performing the polling operation is based at least in part on receiving the fourth message.

In some examples, the status component 445 may be configured as or otherwise support a means for receiving, from the memory device, a fifth message including an indication that a change of the status of the memory device satisfies a criterion based at least in part on transmitting the third message. In some examples, the access component 440 may be configured as or otherwise support a means for transmitting, to the memory device, a sixth message requesting the memory device to transmit data that is ready to be transmitted as part of an access operation based at least in part on receiving the fifth message. In some examples, the access component 440 may be configured as or otherwise support a means for receiving, from the memory device, a seventh message that indicates the data is ready to be transmitted as part of the access operation based at least in part on transmitting the sixth message.

In some examples, the access component 440 may be configured as or otherwise support a means for receiving, from a host system, a read command to perform a read operation at the memory device, where performing the polling operation is based at least in part on receiving the read command and receiving a command to perform the polling operation.

In some examples, the access component 440 may be configured as or otherwise support a means for performing a write operation at the memory device, where performing the polling operation is based at least in part on performing the write operation.

In some examples, the polling operation component 435 may be configured as or otherwise support a means for receiving, from a host system, a command to perform the polling operation, where performing the polling operation according to the one or more polling parameters is based at least in part on receiving the command.

Figure 5:
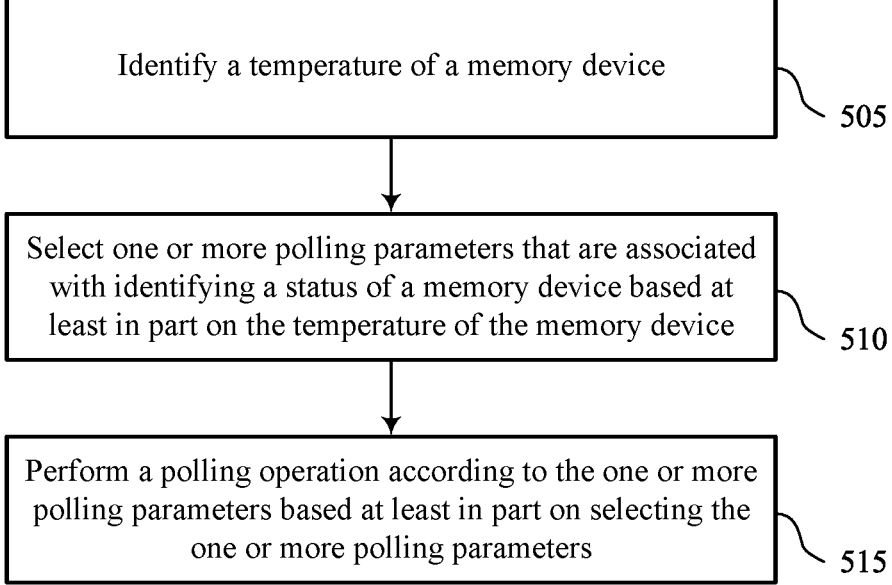
FIG. 5 illustrates a flowchart showing a method or methods that support an adaptive polling for higher density storage in accordance with examples as disclosed herein.

FIG. 5 illustrates a flowchart showing a method 500 that supports an adaptive polling for higher density storage in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include identifying a temperature of a memory device. The operations of 505 may be performed in accordance with examples as disclosed herein. In some examples, aspects of the operations of 505 may be performed by a temperature component 425 as described with reference to FIG. 4.

At 510, the method may include selecting one or more polling parameters that are associated with identifying a status of a memory device based at least in part on the temperature of the memory device. The operations of 510 may be performed in accordance with examples as disclosed herein. In some examples, aspects of the operations of 510 may be performed by a polling parameter component 430 as described with reference to FIG. 4.

At 515, the method may include performing a polling operation according to the one or more polling parameters based at least in part on selecting the one or more polling parameters. The operations of 515 may be performed in accordance with examples as disclosed herein. In some examples, aspects of the operations of 515 may be performed by a polling operation component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for identifying a temperature of a memory device; selecting one or more polling parameters that are associated with identifying a status of a memory device based at least in part on the temperature of the memory device; and performing a polling operation according to the one or more polling parameters based at least in part on selecting the one or more polling parameters.

Aspect 2: The method, apparatus, or non-transitory computer-readable medium of aspect 1, further including operations, features, circuitry, logic, means, or instructions, or any combination thereof for determining whether a change of the temperature of the memory device satisfies a criterion based at least in part on identifying the temperature of the memory device, where selecting the one or more polling parameters is based at least in part on determining whether the change of the temperature satisfies the criterion.

Aspect 3: The method, apparatus, or non-transitory computer-readable medium of any of aspects 1 through 2, further including operations, features, circuitry, logic, means, or instructions, or any combination thereof for receiving, from a host system, an access command to perform an access operation at the memory device, where performing the polling operation is based at least in part on receiving the access command and receiving a command to perform the polling operation.

Aspect 4: The method, apparatus, or non-transitory computer-readable medium of any of aspects 1 through 3, further including operations, features, circuitry, logic, means, or instructions, or any combination thereof for identifying the status of the memory device in performing an access operation based at least in part on performing the polling operation according to the one or more polling parameters and determining whether a change of the status of the memory device satisfies a criterion based at least in part on identifying the status of the memory device, where performing the polling operation according to the one or more polling parameters is based at least in part on determining that the change of the status fails to satisfy the criterion.

Aspect 5: The method, apparatus, or non-transitory computer-readable medium of any of aspects 1 through 4, further including operations, features, circuitry, logic, means, or instructions, or any combination thereof for determining whether the temperature of the memory device satisfies a threshold based at least in part on identifying the temperature of the memory device and adjusting a frequency parameter of the one or more polling parameters based at least in part on determining that the temperature of the memory device satisfies the threshold, the frequency parameter indicating a frequency at which the polling operation occurs.

Aspect 6: The method, apparatus, or non-transitory computer-readable medium of aspect 5, where determining whether the temperature of the memory device satisfies the threshold further includes determining that the temperature of the memory device is higher than the threshold based at least in part on identifying the temperature of the memory device and adjusting the frequency parameter further includes selecting a value for the frequency parameter that causes the polling operation to occur more frequently.

Aspect 7: The method, apparatus, or non-transitory computer-readable medium of any of aspects 1 through 6, further including operations, features, circuitry, logic, means, or instructions, or any combination thereof for adjusting a delay indicating a duration of time between a receipt of an access command at the memory device and a first instance of the polling operation based at least in part on identifying the temperature of the memory device.

Aspect 8: The method, apparatus, or non-transitory computer-readable medium of any of aspects 1 through 7, further including operations, features, circuitry, logic, means, or instructions, or any combination thereof for adjusting a delay indicating a duration of time between writing data to the memory device and a first instance of the polling operation based at least in part on identifying the temperature of the memory device.

Aspect 9: The method, apparatus, or non-transitory computer-readable medium of any of aspects 1 through 8, where the one or more polling parameters include a duration of time between receiving an access command and identifying the status of the memory device, a frequency of identifying the status of the memory device, the duration of time between identifying the status of the memory device, or a combination thereof.

Aspect 10: The method, apparatus, or non-transitory computer-readable medium of any of aspects 1 through 9, further including operations, features, circuitry, logic, means, or instructions, or any combination thereof for receiving, from the memory device, a second message including a temperature of the memory device, where identifying the temperature of the memory device is based at least in part on receiving the second message.

Aspect 11: The method, apparatus, or non-transitory computer-readable medium of any of aspects 1 through 10, further including operations, features, circuitry, logic, means, or instructions, or any combination thereof for receiving, from the memory device, an indication that a change of a temperature of the memory device satisfies a criterion, where performing the polling operation is based at least in part on receiving the indication.

Aspect 12: The method, apparatus, or non-transitory computer-readable medium of any of aspects 1 through 11, further including operations, features, circuitry, logic, means, or instructions, or any combination thereof for determining a duration for performing the polling operation based at least in part on selecting the one or more polling parameters.

Aspect 13: The method, apparatus, or non-transitory computer-readable medium of any of aspects 1 through 12, where performing the polling operation further includes operations, features, circuitry, logic, means, or instructions, or any combination thereof for transmitting, to the memory device, a third message requesting the memory device to transmit an indication of the status of the memory device based at least in part on selecting the one or more polling parameters.

Aspect 14: The method, apparatus, or non-transitory computer-readable medium of aspect 13, further including operations, features, circuitry, logic, means, or instructions, or any combination thereof for receiving, from the memory device, a fourth message including an indication that a change of the status of the memory device fails to satisfy a criterion based at least in part on transmitting the third message, where performing the polling operation is based at least in part on receiving the fourth message.

Aspect 15: The method, apparatus, or non-transitory computer-readable medium of any of aspects 13 through 14, further including operations, features, circuitry, logic, means, or instructions, or any combination thereof for receiving, from the memory device, a fifth message including an indication that a change of the status of the memory device satisfies a criterion based at least in part on transmitting the third message; transmitting, to the memory device, a sixth message requesting the memory device to transmit data that is ready to be transmitted as part of an access operation based at least in part on receiving the fifth message; and receiving, from the memory device, a seventh message that indicates the data is ready to be transmitted as part of the access operation based at least in part on transmitting the sixth message.

Aspect 16: The method, apparatus, or non-transitory computer-readable medium of any of aspects 1 through 15, further including operations, features, circuitry, logic, means, or instructions, or any combination thereof for receiving, from a host system, a read command to perform a read operation at the memory device, where performing the polling operation is based at least in part on receiving the read command and receiving a command to perform the polling operation.

Aspect 17: The method, apparatus, or non-transitory computer-readable medium of any of aspects 1 through 16, further including operations, features, circuitry, logic, means, or instructions, or any combination thereof for performing a write operation at the memory device, where performing the polling operation is based at least in part on performing the write operation.

Aspect 18: The method, apparatus, or non-transitory computer-readable medium of any of aspects 1 through 17, further including operations, features, circuitry, logic, means, or instructions, or any combination thereof for receiving, from a host system, a command to perform the polling operation, where performing the polling operation according to the one or more polling parameters is based at least in part on receiving the command.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory device; and
a controller coupled with the memory device and configured to cause the apparatus to:
identify a temperature of the memory device;
select one or more polling parameters that are associated with identifying a status of the memory device based at least in part on the temperature of the memory device, wherein selecting the one or more polling parameters at least partially overlaps in time with performing an operation to access data at the memory device; and
perform a polling operation according to the one or more polling parameters based at least in part on selecting the one or more polling parameters.

2. The apparatus of claim 1, wherein the controller is further configured to cause the apparatus to:
determine whether a change of the temperature of the memory device satisfies a criterion based at least in part on identifying the temperature of the memory device, wherein selecting the one or more polling parameters is based at least in part on determining whether the change of the temperature satisfies the criterion.

3. The apparatus of claim 1, wherein the controller is further configured to cause the apparatus to:
receive, from a host system, an access command to perform the operation to access the data at the memory device, wherein performing the polling operation is based at least in part on receiving the access command and receiving a command to perform the polling operation.

4. The apparatus of claim 1, wherein the controller is further configured to cause the apparatus to:
identify the status of the memory device in performing the operation to access the data at the memory device based at least in part on performing the polling operation according to the one or more polling parameters; and
determine whether a change of the status of the memory device satisfies a criterion based at least in part on identifying the status of the memory device, wherein performing the polling operation according to the one or more polling parameters is based at least in part on determining that the change of the status fails to satisfy the criterion.

5. The apparatus of claim 1, wherein the controller is further configured to cause the apparatus to:
determine whether the temperature of the memory device satisfies a threshold based at least in part on identifying the temperature of the memory device; and adjust a frequency parameter of the one or more polling parameters based at least in part on determining that the temperature of the memory device satisfies the threshold, the frequency parameter indicating a frequency at which the polling operation occurs.

6. The apparatus of claim 5, wherein:
determining whether the temperature of the memory device satisfies the threshold further comprises determining that the temperature of the memory device is higher than the threshold based at least in part on identifying the temperature of the memory device; and
adjusting the frequency parameter further comprises selecting a value for the frequency parameter that causes the polling operation to occur more frequently.

7. The apparatus of claim 1, wherein the controller is further configured to cause the apparatus to:
adjust a delay indicating a duration of time between a receipt of an access command at the memory device and a first instance of the polling operation based at least in part on identifying the temperature of the memory device.

8. The apparatus of claim 1, wherein the controller is further configured to cause the apparatus to:
adjust a delay indicating a duration of time between writing data to the memory device and a first instance of the polling operation based at least in part on identifying the temperature of the memory device.

9. The apparatus of claim 1, wherein the one or more polling parameters comprise a duration of time between receiving an access command to perform the operation to access the data at the memory device and identifying the status of the memory device.

10. The apparatus of claim 1, wherein the controller is further configured to cause the apparatus to:
receive, from the memory device, a second message comprising the temperature of the memory device, wherein identifying the temperature of the memory device is based at least in part on receiving the second message.

11. The apparatus of claim 1, wherein the controller is further configured to cause the apparatus to:
receive, from the memory device, an indication that a change of the temperature of the memory device satisfies a criterion, wherein performing the polling operation is based at least in part on receiving the indication.

12. The apparatus of claim 1, wherein the controller is further configured to cause the apparatus to:
determine a duration for performing the polling operation based at least in part on selecting the one or more polling parameters.

13. The apparatus of claim 1, wherein performing the polling operation is further configured to cause the apparatus to:
transmit, to the memory device, a third message requesting the memory device to transmit an indication of the status of the memory device based at least in part on selecting the one or more polling parameters.

14. The apparatus of claim 13, wherein the controller is further configured to cause the apparatus to:
receive, from the memory device, a fourth message comprising an indication that a change of the status of the memory device fails to satisfy a criterion based at least in part on transmitting the third message, wherein performing the polling operation is based at least in part on receiving the fourth message.

15. The apparatus of claim 13, wherein the controller is further configured to cause the apparatus to:

receive, from the memory device, a fifth message comprising an indication that a change of the status of the memory device satisfies a criterion based at least in part on transmitting the third message;

transmit, to the memory device, a sixth message requesting the memory device to transmit data that is ready to be transmitted as part of the operation to access the data at the memory device based at least in part on receiving the fifth message; and receive, from the memory device, a seventh message that indicates the data is ready to be transmitted as part of the operation to access the data at the memory device based at least in part on transmitting the sixth message.

16. The apparatus of claim 1, wherein the controller is further configured to cause the apparatus to:

receive, from a host system, a read command to perform a read operation at the memory device, wherein performing the polling operation is based at least in part on receiving the read command and receiving a command to perform the polling operation.

17. The apparatus of claim 1, wherein the controller is further configured to cause the apparatus to:

perform a write operation at the memory device, wherein performing the polling operation is based at least in part on performing the write operation.

18. The apparatus of claim 1, wherein the controller is further configured to cause the apparatus to:

receive, from a host system, a command to perform the polling operation, wherein performing the polling operation according to the one or more polling parameters is based at least in part on receiving the command.

19. A non-transitory computer-readable medium storing code, the code comprising instructions executable by processing circuitry to:

identify a temperature of a memory device;

select one or more polling parameters that are associated with identifying a status of the memory device based at least in part on the temperature of the memory device, wherein selecting the one or more polling parameters at least partially overlaps in time with performing an operation to access data at the memory device; and perform a polling operation according to the one or more polling parameters based at least in part on selecting the one or more polling parameters.

20. A method, comprising:

identifying a temperature of a memory device;

selecting one or more polling parameters that are associated with identifying a status of the memory device based at least in part on the temperature of the memory device, wherein selecting the one or more polling parameters at least partially overlaps in time with performing an operation to access data at the memory device; and performing a polling operation according to the one or more polling parameters based at least in part on selecting the one or more polling parameters.

* * * * *